(12) United States Patent
Sumiuchi et al.

(10) Patent No.: US 6,304,338 B1
(45) Date of Patent: *Oct. 16, 2001

(54) IMAGE PROCESSING APPARATUS AND METHOD

(75) Inventors: Kazuyoshi Sumiuchi, Kawasaki; Masahiro Nagatani, Yokohama, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/870,721

(22) Filed: Jun. 7, 1997

(30) Foreign Application Priority Data

Jun. 7, 1996 (JP) ..................................................... 8-145982

(51) Int. Cl.$^7$ ........................................................ G06F 15/00
(52) U.S. Cl. ........................... 358/1.9; 358/515; 358/516; 358/519
(58) Field of Search .............................. 395/109; 382/163, 382/167, 274, 275; 358/515, 518, 519, 520, 1.9

(56) References Cited

U.S. PATENT DOCUMENTS

| | | | |
|---|---|---|---|
| 4,682,186 | * 7/1987 | Sasaki et al. | 346/140 |
| 5,528,270 | * 6/1996 | Tajika et al. | 347/19 |
| 5,539,526 | * 7/1996 | Suzuki et al. | 358/298 |
| 5,841,897 | * 11/1998 | Numakura et al. | 382/163 |
| 5,847,729 | * 12/1998 | Takahashi et al. | 347/43 |
| 5,982,947 | * 11/1999 | Hayashi | 382/274 |

* cited by examiner

*Primary Examiner*—Joseph Mancuso
*Assistant Examiner*—Douglas Tran
(74) *Attorney, Agent, or Firm*—Fitzpatrick, Cella, Harper & Scinto

(57) ABSTRACT

In image formation, one of a plurality of print modes having different allowable print-material discharge amounts is selected. Color image data inputted by an image generator is converted by a LOG converter into CMY data. An UCR & black-generation processor performs density control on the CMY data by each color component, and performs under-color removal and black-generation processing on the density-controlled image data. The UCR & black-generation processor controls a total amount value of the output image data, based on the allowable print-material discharge amount of the selected print mode. The obtained image data is γ corrected and binarized, then outputted to a printer.

10 Claims, 15 Drawing Sheets

IMAGE PROCESSING APPARATUS AND METHOD

BACKGROUND OF THE INVENTION

This invention relates to an image processing apparatus and method and, more particularly to an image processing apparatus and method which appropriately controls print processing when an amount of ink to be discharged onto a print medium is limited.

In an ink-jet printing method, an ink-discharge amount acceptable for a print medium (allowable ink-discharge amount) is determined based on the characteristic, e.g., absorptivity, of the print medium. Especially, in case of color printing, if ink-discharge amount exceeds the allowable ink-discharge amount of the print medium, blur occurs at boundaries between respective colors, thus degrading image quality.

Assuming that the amount of ink droplets forming one pixel is 40 pl (picoliter) per color, the ink-discharge amount per unit area is about 220% with respect to normal paper; about 280% with respect to coated paper; about 300% with respect to an OHP sheet for ink-jet printing; and about 340% with respect to a luster film for ink-jet printing wherein 40 pl is defined as 100%. In this manner, the allowable ink-discharge amount depends on ink absorptivity of material of print medium.

In consideration of the above situation, a printing technique, which changes the size of ink droplet in accordance with the type of print medium, thus controls ink-discharge amount per unit area, has been proposed.

Further, a printing technique which allows to discharge ink of respective colors as much as possible, within the limitation of ink-discharge amount with respect to a print medium, thus widens representable color space, has been proposed. This technique limits the minimum value (under color) of the multilevel yellow, magenta and cyan components in one pixel, based on multilevel yellow, magenta, cyan data, and limits an ink-discharge amount of a primary color represented by a single ink color (any of yellow, magenta, cyan), or an ink-discharge amount of a secondary color represented by combination of two primary colors such as yellow and magenta, cyan and yellow, and magenta and cyan.

Conventionally, the above ink-jet printing method performs desirable density control to adjust each ink-discharge amount for multilevel yellow, magenta, cyan and black colors. The density control increases or decreases density of each color.

However, as a conventional density control is made by simply increasing or decreasing density of each color ink, in the above processing to limit respective ink-discharge amounts for allowing discharge of respective color ink within limitation of ink-discharge amount with respect to a print medium, if the density control is performed on multilevel data, under the limitation of ink-discharge amount, to increase the ink density, the ink of an amount exceeding the allowable ink-discharge amount with respect to the print medium is discharged as a result of the density control.

Further, in the ink-jet printing method, density control corresponding to each ink-discharge amount of each color ink is performed by each of multilevel cyan (C), magenta (M), yellow (Y) and black (K) color components, which disturbs gray balance.

In a low-cost color printer which mainly performs printing by using C, M and Y three color ink, a gray color is represented by overlaying the C, M and Y ink droplets. In this printer, if density control is performed by increasing or decreasing each color density, gray balance is disturbed. For example, if cyan density is increased, the resulted gray has a bluish tint.

SUMMARY OF THE INVENTION

The present invention has been made in consideration of the above situation, and has its object to provide an image processing apparatus and method which performs appropriate image density control, in a printer under limitation of print-material-discharge amount. Note that "print material" generally means material for visible-image recording such as ink used in an ink-jet method, toner in an electrostatic photographic method.

Further, another object of the present invention is to provide an image processing apparatus and method which performs appropriate image density control while maintaining gray balance.

Further, another object of the present invention is to limit a print-material discharge amount in accordance with a plurality of print resolutions, thus perform appropriate control on the print-material discharge amount in a resolution-changeable printer.

Further, another object of the present invention is to limit a print-material discharge amount in accordance with plural types of print media having different maximum print-material discharge amounts per unit area, thus perform appropriate control on the print-material discharge amount in accordance with the plural types of print media.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

[First Embodiment]

Figure 1:
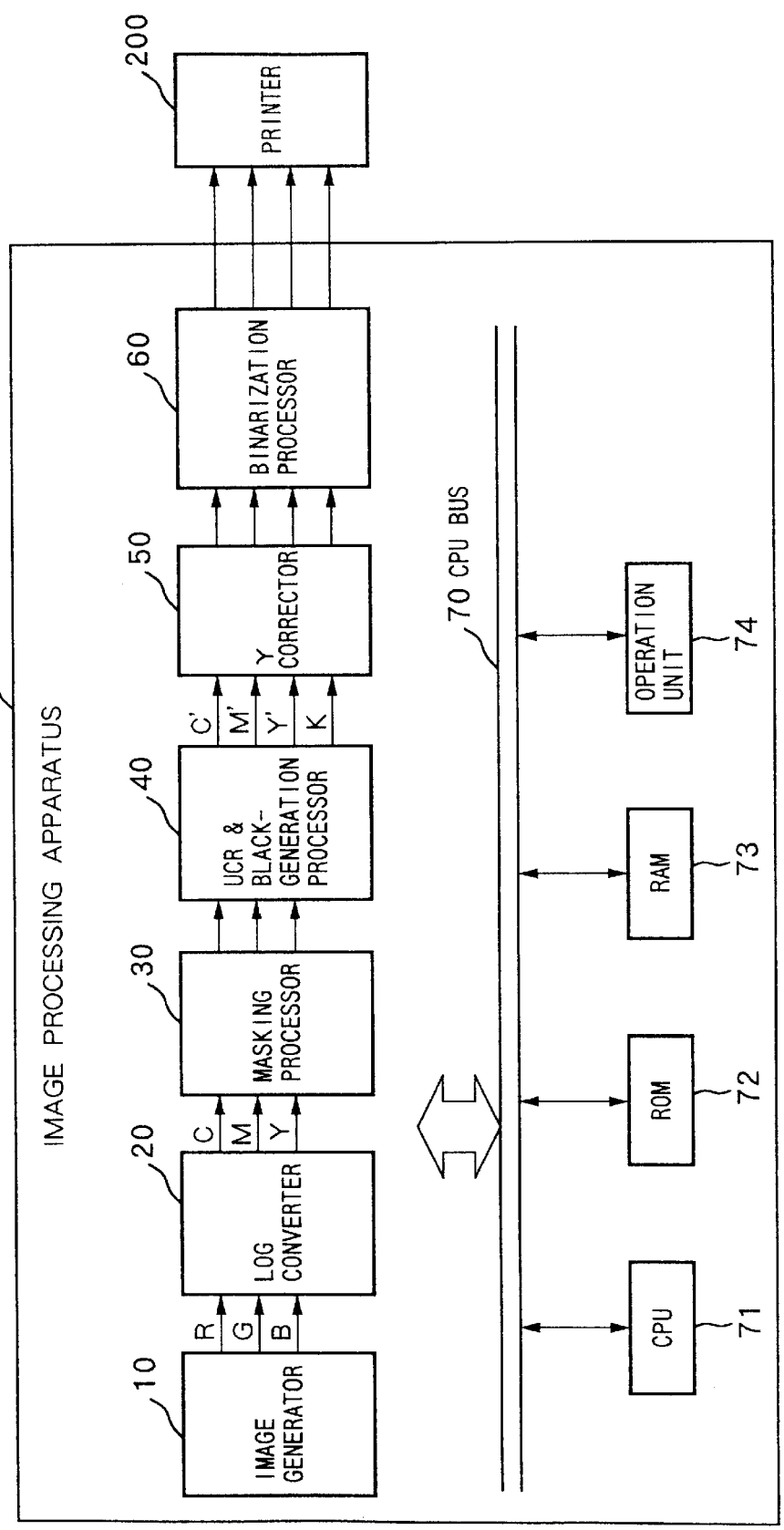
FIG. 1 is a block diagram showing an example of a construction of an image processing system according to a first embodiment of the present invention.

FIG. 1 is a block diagram showing an example of a construction of an image processing system according to a first embodiment of the present invention. The image processing system comprises an image processing apparatus 100 and a printer 200. Note that the image processing apparatus 100 may be connected to a monitor, a scanner and the like. First, the construction of the image processing apparatus 100 will be described.

An image generator 10 generates R, G and B image data representing an arbitrary image, by an application program or the like. A LOG converter 20 performs luminance-density conversion on the RGB image data, and outputs CMY image data. A masking processor 30 performs color correction on the image data by using a matrix operation, based on characteristics of ink used by the printer 200.

An UCR & black-generation processor 40 performs UCR (under-color removal) processing and black-generation processing to be described later, based on the input CMY image data, and generates C' M' Y' K image data.

A γ corrector 50 performs tonality correction to be described later on respective color components (CMYK) of the image data, so as to correct the tonality of the image data into a linear tonality. A binarization processor 60 binarizes the image data having multilevel representation with respect to the respective CMYK color components, by using a dither processing method or error diffusion processing method. The dither processing method and error diffusion processing method are well known methods, therefore explanation of these methods will be omitted.

A CPU 71 performs various controls in accordance with control programs stored in a ROM 72. The ROM 72 is used for storing the various control programs for the CPU 71 and various data. A RAM 73 provides a work area when the CPU 71 performs the various processings. An operation unit 74 is a user interface for various operations with respect to the image processing apparatus 100. Note that a user can perform density control of each of color components (CMY) via the operation unit 74. A CPU bus 70 data-communicably connects the above elements. The user can designate a print medium to be used or a print resolution (to be described later) from the operation unit 74. The image processing apparatus 100 controls an ink-discharge amount in accordance with the designated print medium and resolution.

Next, the printer 200 will be described. The printer 200 forms an image on a print medium by using printheads and print materials (ink) corresponding to respective CMYK color components, in accordance with the ink-jet printing method, based on image data (CMYK image data) inputted from the image processing apparatus 100.

Specifically, the printer 200 performs printing by scanning a printhead where a plurality of nozzles are arranged in a subscanning direction, in a main-scanning direction. As one-line printing is completed, the printer 200 conveys a print medium in the subscanning direction, returns the printhead to a print-start position, and performs printing of the next line. This procedure is repeated for one page of print medium, as serial printing method.

Figure 2:
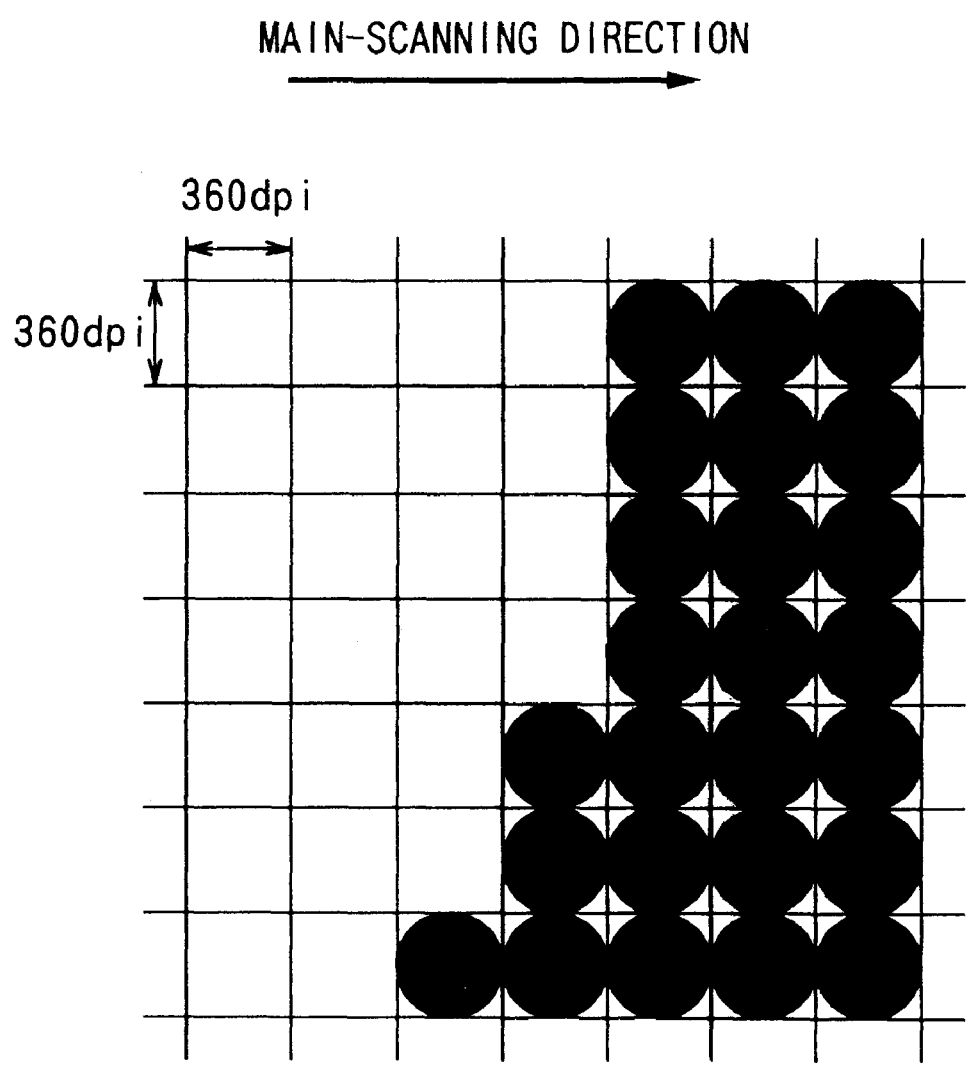
FIG. 2 is an explanatory view showing normal printing by an ink-jet method by a printhead corresponding to 360×360 dpi (dot per inch) resolution.
Figure 3:
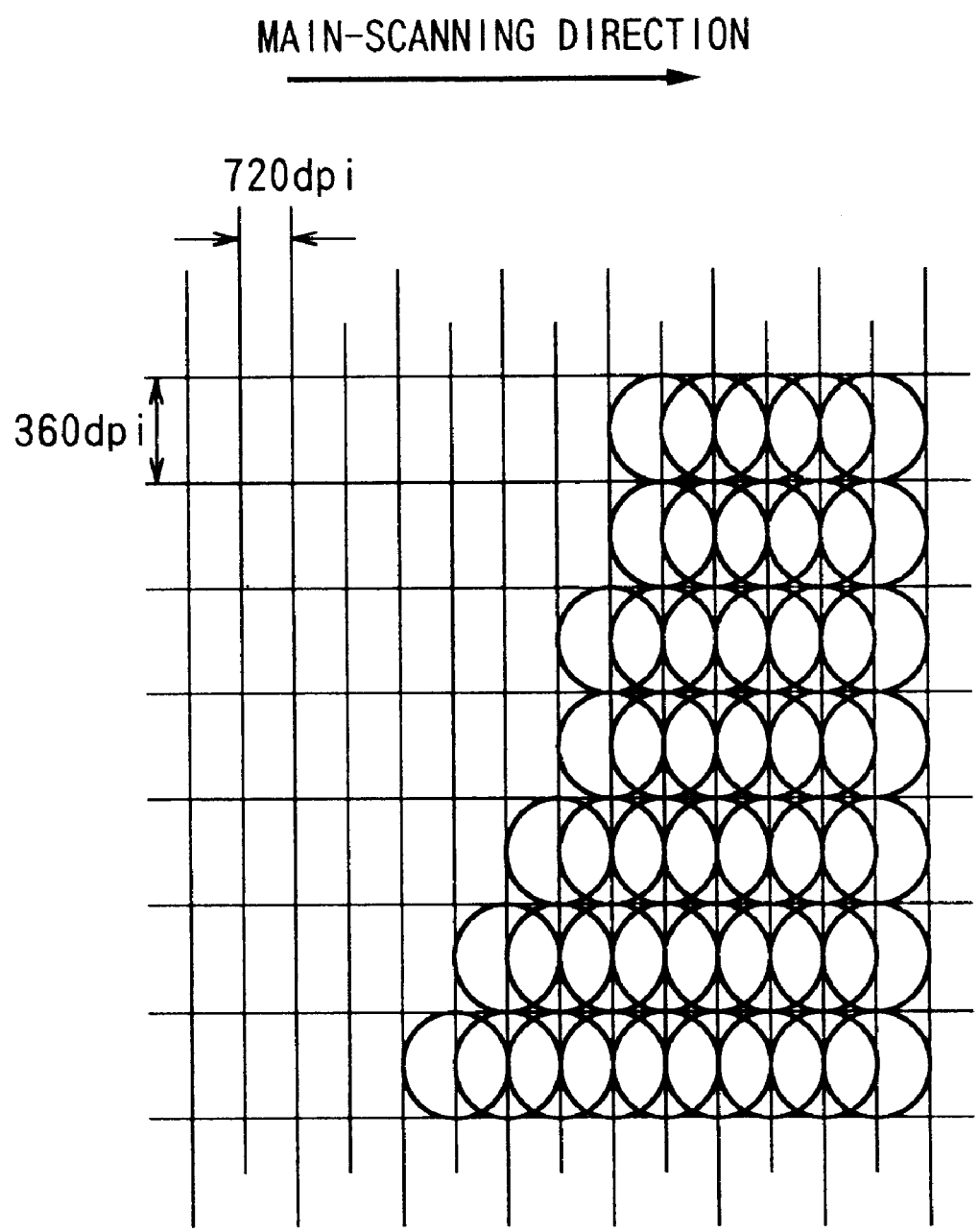
FIG. 3 is an explanatory view showing 720×360 dpi high-resolution printing by the printhead corresponding to 360×360 dpi resolution.

In the printer 200, to form a high-resolution image, movement of the printhead in the main-scanning direction is made at a pitch ½ of normal pitch, without changing the dot diameter of the printhead. This seemingly increases the resolution in the main-scanning direction to twice. FIGS. 2 and 3 show this operation. FIG. 2 shows normal printing by an ink-jet method by a printhead corresponding to 360 (width)×360 (length) dpi (dot per inch) resolution. FIG. 3 shows high-resolution (720×360 dpi) printing by the printhead corresponding to 360×360 dpi resolution. In printing of the low 360×360 dpi resolution, image dots are printed as shown in FIG. 2. On the other hand, in printing of the high 720×360 dpi resolution, image dots are printed as shown in FIG. 3.

However, as it is designed such that ink droplets discharged from the printhead may have an appropriate size at a low resolution, in case of high-resolution printing as shown in FIG. 3, a doubled amount of ink is discharged onto the print medium, whereby the ink overflows on the print medium and the quality of formed image is degraded.

As means of solving this problem, image-data processing for separating secondary and tertiary colors and limiting each ink-discharge amount has been proposed. However, when image density control is performed on image data, obtained from the above image-data processing, where the secondary and tertiary colors have been separated and each ink-discharge amount has been limited, image-density control by simply increasing or decreasing an ink density may cause the following problem. That is, if ink density is increased, even if the ink-discharge amount of the ink has been limited, the ink may be discharged by an amount exceeding the limited amount. Thus, the image-density control may cause ink smear on the print medium, degrading the quality of formed image.

Hereinafter, image processing for forming an image, while preventing overflow of print material, regardless of low-resolution printing or high-resolution printing, will be described below.

Figure 13:
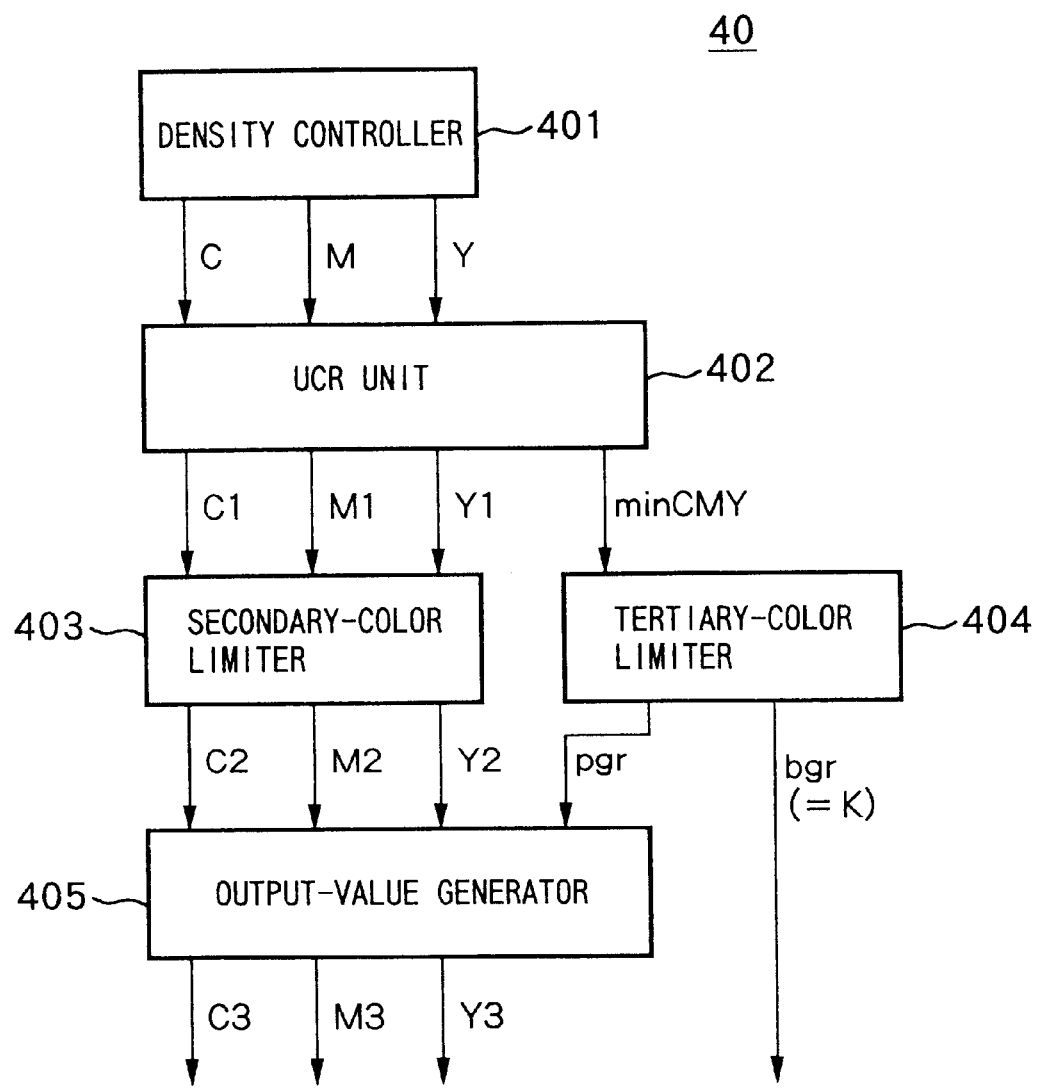
FIG. 13 is a block diagram showing the outline of operation of an UCR & black-generation processor according to the first embodiment.

FIG. 13 is a block diagram showing the outline of operation of the UCR & black-generation processor 40 according to the first embodiment. A density controller 401 changes values of respective color components of input CMY data, in accordance with an operation instruction from the operation unit 74. An UCR unit 402 performs under-color removal on the CMY data inputted from the density controller 401, and obtains an under-color component value (minCMY) and color component values C1, M1 and Y1. A secondary-color limiter 403 limits an ink-discharge amount with respect to each secondary color component extracted from the values C1, M1 and Y1, and generates color component values C2, M2 and Y2. A tertiary-color limiter 404 limits an ink-discharge amount with respect to the under-color component (minCMY), and generates a pgr component to be returned to the three color components and a bgr component for image formation by black ink. A chromatic-color output value generator 405 generates output data C3, M3 and Y3 by using the components C2, M2, Y2 and the pgr component. Hereinbelow, these processings will be described in detail.

Figure 4:
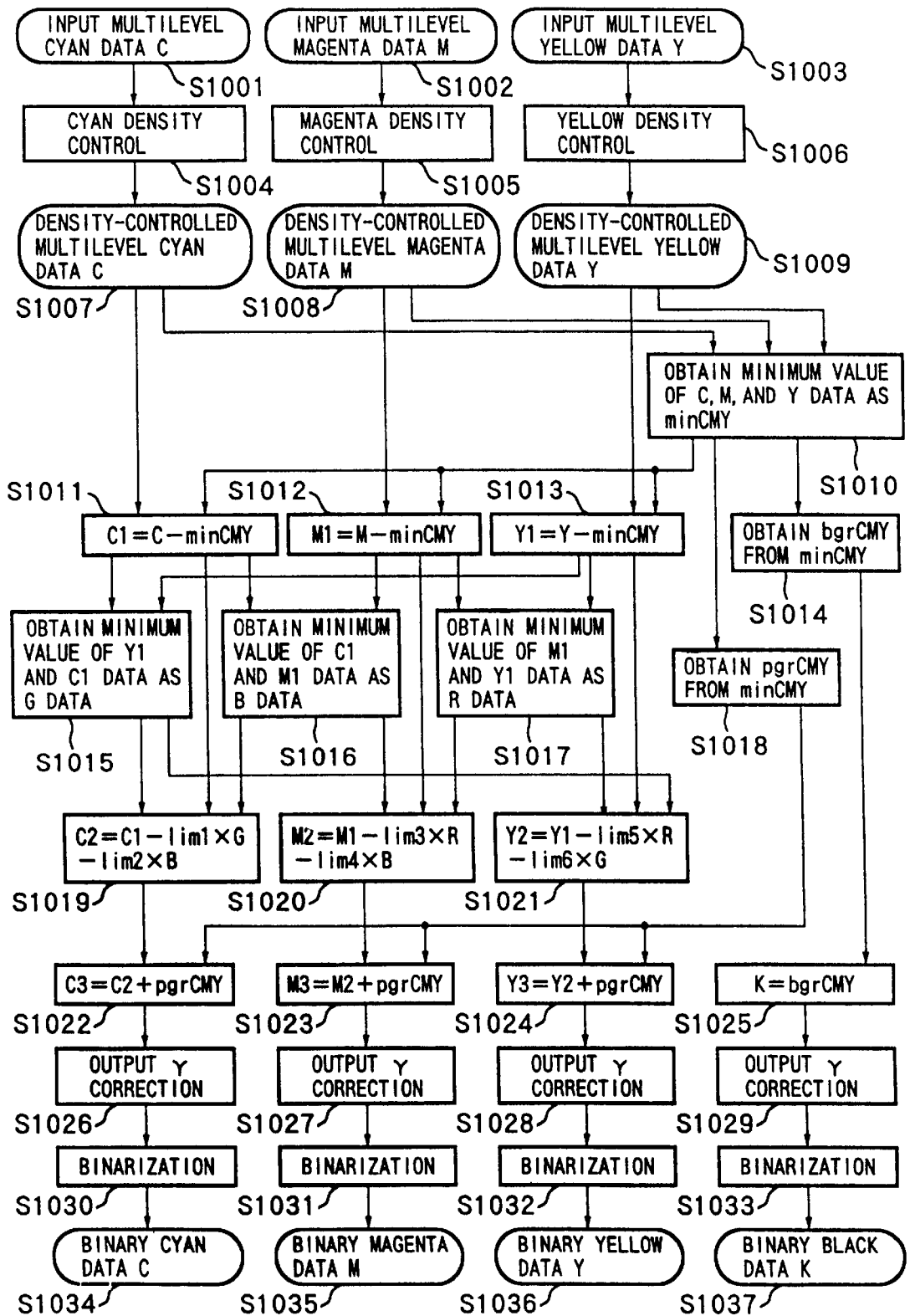
FIG. 4 is a flowchart showing process procedure by UCR & black-generation processor, γ corrector and binarization processor.

The present embodiment enables appropriate image-density control in image-data processing which separates secondary and tertiary colors and limits each ink-discharge amount per each of these colors. In the image processing apparatus 100, the process procedure by the UCR & black-generation processor 40, the γ corrector 50 and the binarization processor 60 in a high-resolution mode will be described with reference to FIG. 4. Note that the respective processors operate under the control of the CPU 71 as described above, and the control program for executing the control as shown in FIG. 4 is stored in the ROM 72. Further, a part or all the processing as described below may be performed by hardware. In the present embodiment, the maximum ink-discharge amount in the high-resolution print mode is 170%.

First, multilevel cyan (C), magenta (M) and yellow (Y) image data are inputted (steps S1001 to S1003). In this embodiment, each of cyan, magenta and yellow is represented by 8 bits, i.e., 0 to 255 level value.

Next, density control is performed on the respective multilevel C, M and Y data (by density controller 401). The density control is performed in accordance with an instruction from the user via the operation unit 74. Note that the present embodiment is described in terms of density control of respective colors as image-density control, however, the image-density control is not limited to the above density control. For example, luminance control (control on RGB) may be performed.

Assuming that density-control functions are DensityC( ), DensityM( ) and DensityY( ), density-controlled C, M and Y components are represented as:

$$C = \text{DensityC}(C) \quad (1)$$

$$M = \text{DensityM}(M) \quad (2)$$

$$Y = \text{DensityY}(Y) \quad (3)$$

Figure 5:
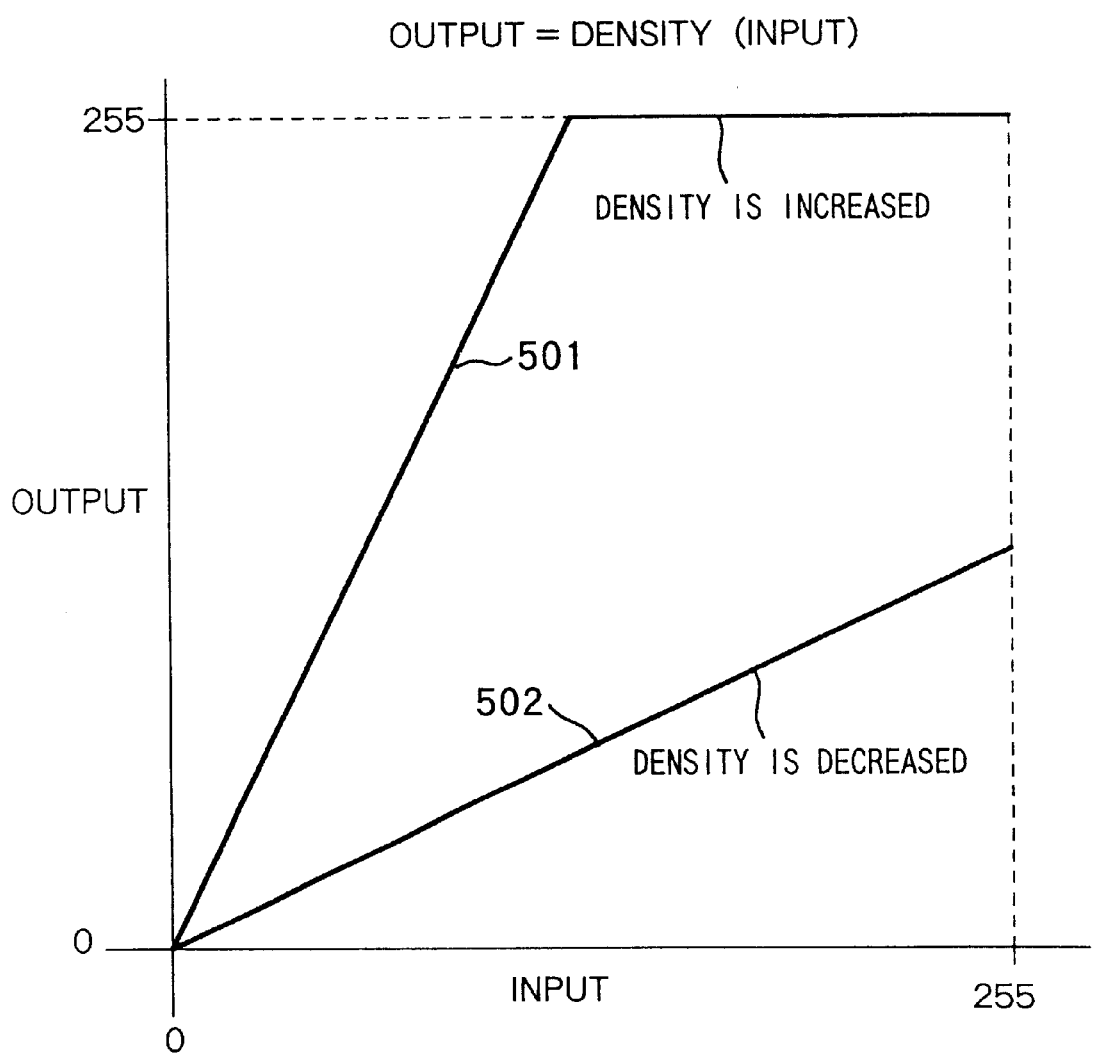
FIG. 5 is a line graph showing an example of functions for density control.

FIG. 5 is a line graph showing an example of the density-control function. If a linear density control as a density control method is performed, functions such as the function Density( ) in FIG. 5 are obtained for respective colors, and density-controlled output values corresponding to input values of the C, M and Y components are held in the form of table. Upon density control, these tables are used for conversion (steps S1004 to S1006), and density-controlled C, M and Y components are obtained (steps S1007 to S1009). Note that in FIG. 5, in case of control to increase density, tables of output values, as represented by a steeper sloped straight line 501, are used, while in case of control to decrease density, tables of output values, as represented by a gentle sloped straight line 502, are used.

Next, processing for separating secondary and tertiary colors is performed to limit each ink-discharge amount. The minimum value data is obtained from the density-controlled multilevel C, M and Y data as minCMY data (step S1010). Next, the minCMY data is subtracted from the density-controlled C, M and Y data obtained at steps S1007 to S1009, as under-color removed C1, M1 and Y1 data (steps S1011 to S1013). Note that the above processing is performed by the UCR unit 402.

That is, the under-color removed C, M and Y (C1, M1 and Y1) data are represented as:

$$C1 = C - \text{minCMY} \quad (4)$$

$$M1 = M - \text{minCMY} \quad (5)$$

$$Y1 = Y - \text{minCMY} \quad (6)$$

In the output values obtained at steps S1011 to S1013, when the input image data is a primary color, two of the C1, M1 and Y1 component data have value "0", and when the input image data is a secondary or tertiary color, one of the C1, M1 and Y1 component data has value "0".

Next, the minimum value of the C1 and Y1 data obtained at steps S1011 and S1013 is obtained as G data (step S1015). Similarly, the minimum value of the C1 and M1 data obtained at steps S1011 and S1012 is obtained as B data (step S1016). Further, the minimum value of the M1 and Y1 data obtained at steps S1012 and S1013 is obtained as R data (step S1017). In these output values (R, G and B) obtained at steps S1015 to 1017, when the input image data is a primary color, all the R, G and B data have value "0", while when the input image data is a secondary or tertiary color, two of the R, G and B data have value "0". The output values (R, G and B) are data in color space of R (red), G (green) and B (blue) components obtained from (M1, Y1), (C1, Y1) and (C1, M1) components.

Note that "primary color" corresponds to YMC component data where two color components have value "0"; "secondary color", the YMC component data where one color component has value "0"; and "tertiary color", the YMC component data where no component has value "0".

Next, C2, M2 and Y2 component data are obtained from the following calculations by using the C1, M1 and Y1 components obtained at steps S1011 to S1013 and the R, G and B values obtained at steps S1015 to S1017:

$$C2 = C1 - \text{lim1} \times G - \text{lim2} \times B \quad (7)$$

$$M2 = M1 - \text{lim3} \times R - \text{lim4} \times B \quad (8)$$

$$Y2 = Y1 - \text{lim5} \times R - \text{lim6} \times G \quad (9)$$

lim1 to lim6: real number equal to or greater than 0 and less than 1

By using these component data C2, M2 and Y2, a maximum ink-discharge amount of primary colors derived from the input CMY data is determined. In this example, when the maximum ink-discharge amount is up to 170%, lim1 to lim6 are set as follows:

$$\text{lim1} + \text{lim6} \geq 0.3 \quad (10)$$

$$\text{lim2} + \text{lim4} \geq 0.3 \quad (11)$$

$$\text{lim3} + \text{lim5} \geq 0.3 \quad (12)$$

Note that coefficients lim1 to lim6 correspond to a case where the total ink-discharge amount is 170%. These coefficients lim1 to lim6 are set as follows. First, regarding secondary colors, the total ink-discharge amount is 200%. If C1=M1=100%, and Y1=0% hold, as R=G=0%, and B=100% hold, $$C2 = 100\% - \text{lim2} \times 100\% \quad (7)$$

$$M2 = 100\% - \text{lim4} \times 100\% \quad (8)$$

$$Y2 = 0\%$$

Then the total ink-discharge amount is:

$$C2+M2+Y2=200\%-(\text{lim}2+\text{lim}4)\times100\%$$

To limit the ink-discharge amount to 170%, from C2+M2+Y2<170%, $$200\%-(\text{lim}2+\text{lim}4)\times100\%\leq170\%$$

$$\text{lim}2+\text{lim}4\geq0.3$$

Accordingly, the right members of expressions (10) to (12) are 0.3. Accordingly, when the total ink-discharge amount is 160%, the right members of expressions (10) to (12) are 0.4. Similarly, when the maximum ink-discharge amount is limited to 180%, the right members of these expressions are 0.2.

Regarding the B component, the coefficients (lim2 and lim4) are independently set for the C and M components associated with the B component. The limitation on the C and M components can be freely set by controlling the coefficients lim2 and lim4. Accordingly, color tint of the C, M and Y data in image formation can be controlled within an allowable range (170%) of the ink-discharge amount. The above processing is performed by the secondary-color limiter 403.

On the other hand, at step S1014, processing for generating a multilevel black (K) data (bgrCMY) from the value of the minYMC data (black generating processing) is performed. Assuming that the function for this processing is BGR( ), the generated bgrCMY data is represented by:

$$\text{bgrCMY}=\text{BGR}(\text{minCMY}) \tag{13}$$

Further, multilevel pgrCMY data to be returned to the respective Y, M and C data is obtained from the value of the minCMY data (step S1018). Assuming that the function for obtaining the pgrCMY data is PGR( ), the obtained pgrCMY data is represented by:

$$\text{pgrCMY}=\text{PGR}(\text{minCMY}) \tag{14}$$

In a case where the maximum ink-discharge amount is 170% with respect to the maximum multilevel values, the functions BGR( ) and PGR( ) are set so that the following equation holds:

$$\text{pgrCMY}\times3+\text{bgrCMY}<1.7\,\text{minCMY} \tag{15}$$

Figure 6:
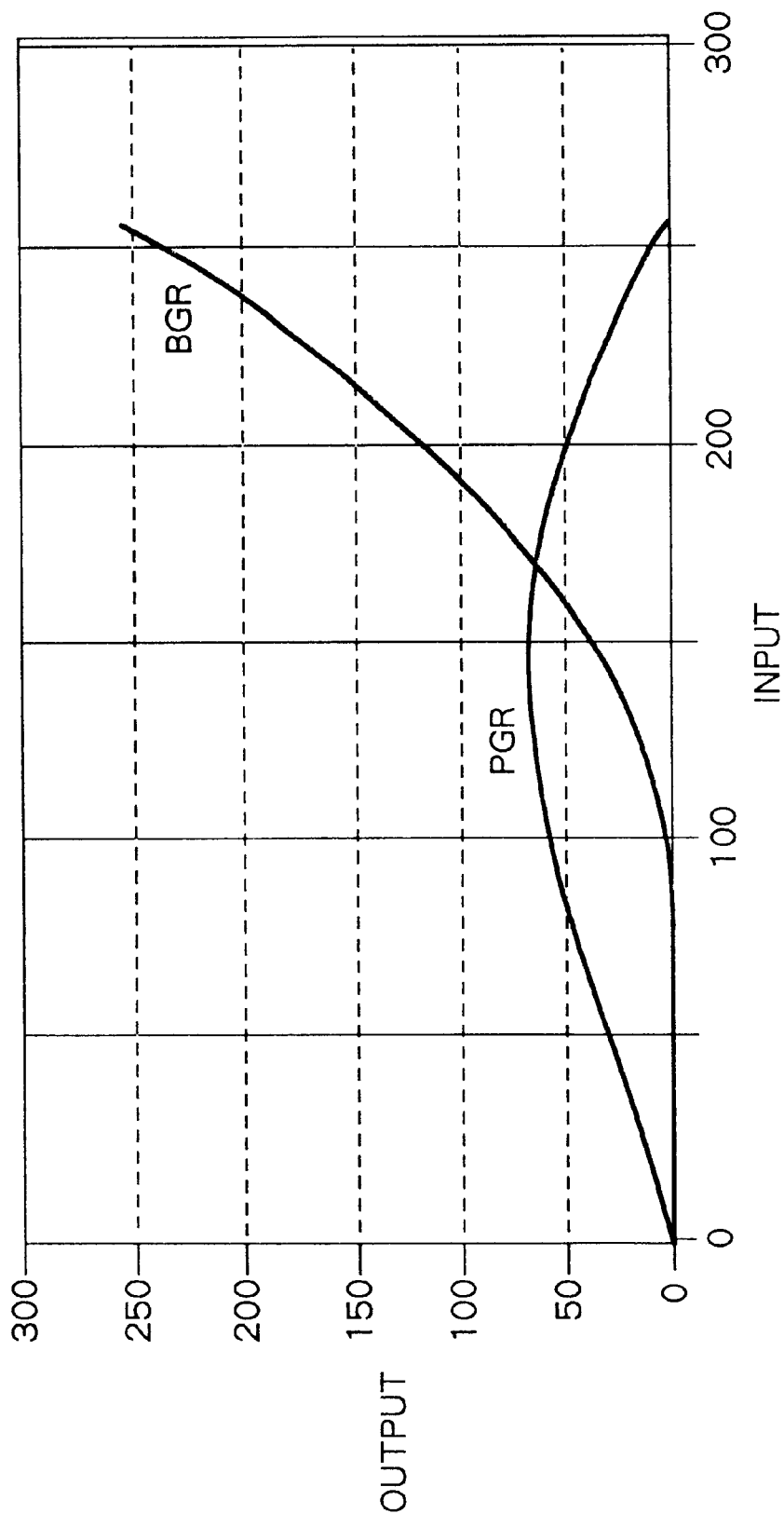
FIG. 6 is a line graph showing an example of functions BGR( ) and PGR( )

FIG. 6 also shows an example of the functions BGR( ) and PGR( ). The above equation (15) is satisfied by using the functions BGR( ) and PGR( ) as shown in FIG. 6. FIG. 6 shows that the amount of under-color removal (UCR) by the minCMY data is greater than the amount of black (K) generation by using the functions bgrCMY and PGRCMY. Thus, similar to the secondary colors, the ink-discharge amount with respect to tertiary colors is limited by setting the relation of these amounts as the UCR amount >K generation amount. In the present embodiment, to limit the ink-discharge amount to 170%, the relation between the UCR amount and K generation amount is:

$$\text{UCR amount (Max 300\%)}>\text{K generation amount (Max 170\%)}$$

Further, the above expression (15) is used to limit the ink-discharge amount to 170%. However, when the ink-discharge amount is limited to 160%, the following expression can be set:

$$\text{pgrCMY}\times3+\text{bgrCMY}<1.6\times\text{minCMY}$$

That is, the limitation on the tertiary colors is made by setting the relation of these amounts as UCR amount >K generation amount. The black generation amount is set by using the functions BGR( ) and PGR( ). The above processing is performed by the tertiary-color limiter 404.

The functions BGR( ) and PGR( ) as shown in FIG. 6 are used only when the limitation of ink-discharge amount is 170%. As described above, when the limitation of ink-discharge amount changes, the functions BGR( ) and PGR( ) change. Accordingly, these functions are set in accordance with a set ink-discharge amount.

Next, the following processing is performed to obtain C3, M3 and Y3 data (steps S1022 to 1025), from the C2, M2 and Y2 data obtained at steps S1019 to S1021 and the pgrCMY and bgrCMY data obtained at steps S1014 and S1018:

$$C3=C2+\text{pgrCMY} \tag{16}$$

$$M3=M2+\text{pgrCMY} \tag{17}$$

$$Y3=Y2+\text{pgrCMY} \tag{18}$$

$$K=\text{bgrCMY} \tag{19}$$

In this manner, the ink-discharge amount using the tertiary color can be limited to 170% by limiting the pgrCMY and bgrCMY data (expression (15)). The above processing is made by the output-value generator 405. The output-data generator 405 outputs the C3, M3 and Y3 data as C', M' and Y' data in FIG. 1.

Figure 7:
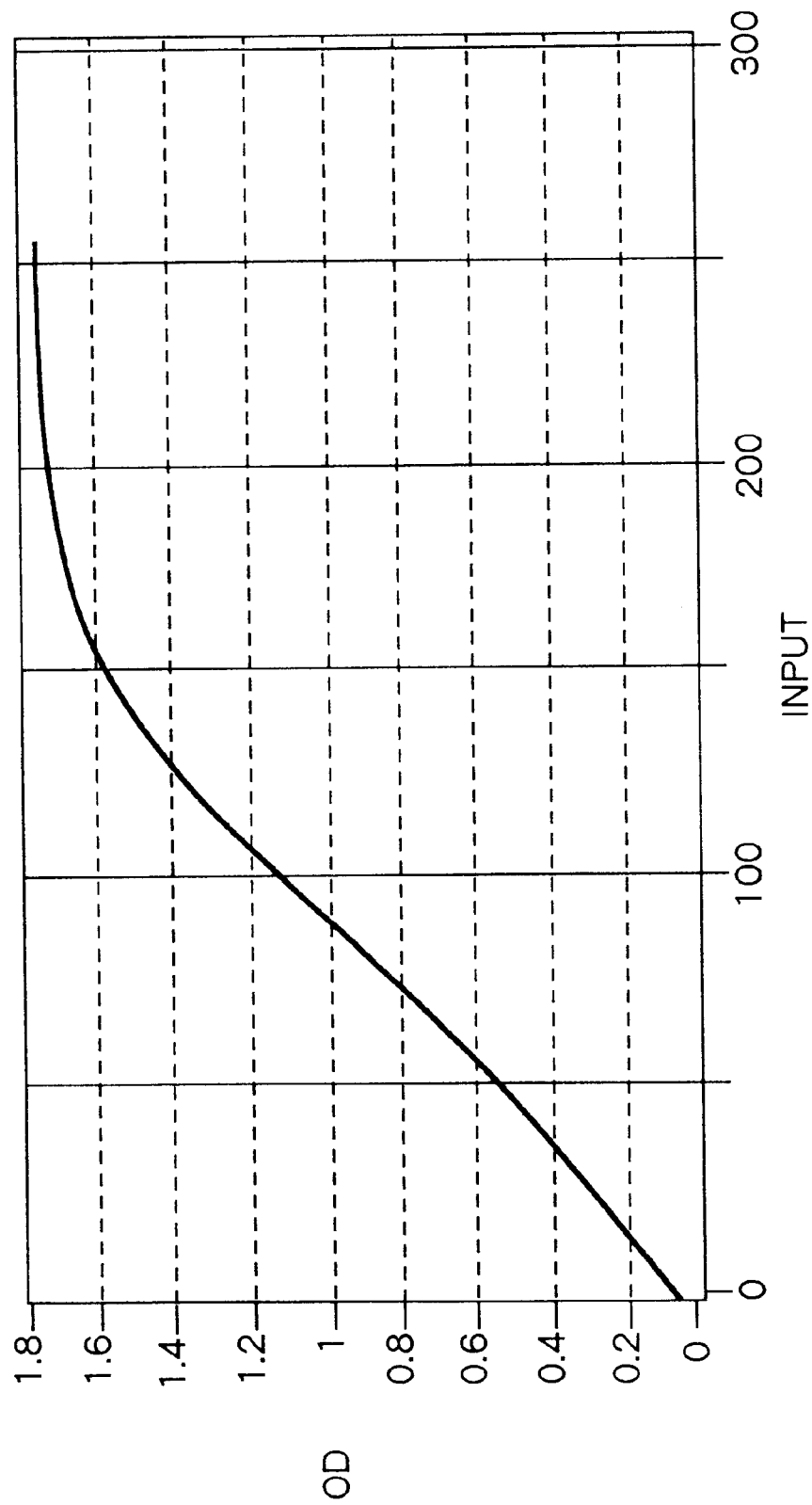
FIG. 7 is a line graph showing the relation between multilevel value and reflection density in case of printing by using cyan ink, according to the first embodiment of the present invention.

Next, the γ correction will be described. In a case where multilevel CMYK values are converted into binary values and the ink is discharged on a print medium, the reflection densities (transmission densities in case of transmission-type medium) of the respective colors are respectively expressed by functions ODC( ), ODMO, ODY( ) and ODK( ). In the present embodiment, for 720×360 dpi printing by using 40 pl ink droplets, color image data of respectively 0 to 255 levels are binarized by using the error diffusion method. The relation between the multilevel value and reflection density in printing with cyan ink under the above conditions is as shown in FIG. 7.

To obtain a linear tonality in a printed image, the reflection density must be in proportional relation to a multilevel value. Therefore, the multilevel C3, M3, Y3 and K data are subjected to the following equations by using respective functions fc( ), fm( ), fy( ) and fk( ):

$$\text{ODC}(\text{fc}(c))=ac\times C+bc \tag{20}$$

$$\text{ODM}(\text{fm}(M))=am\times M+bm \tag{21}$$

$$\text{ODY}(\text{fy}(Y))=ay\times Y+by \tag{22}$$

$$\text{ODK}(\text{fk}(K))=ak\times K+bk \tag{23}$$

ac, am, ay, ak: coefficient greater than "0"

bc, bm, by, bk: reflection densities of print medium

The output γ correction is performed on the multilevel C3, M3, Y3 and K data obtained at steps S1022 to S1025, by using the above functions fc( ), fm( ), fy( ) and fk( ), and corrected multilevel C4, M4 and Y4 and K4 are obtained (steps S1026 to S1029). That is, γ conversion is performed by:

$$C4=fc(C3) \quad (24)$$

$$M4=fm(M3) \quad (25)$$

$$Y3=fy(Y3) \quad (26)$$

$$K4=fk(K) \quad (27)$$

Figure 8:
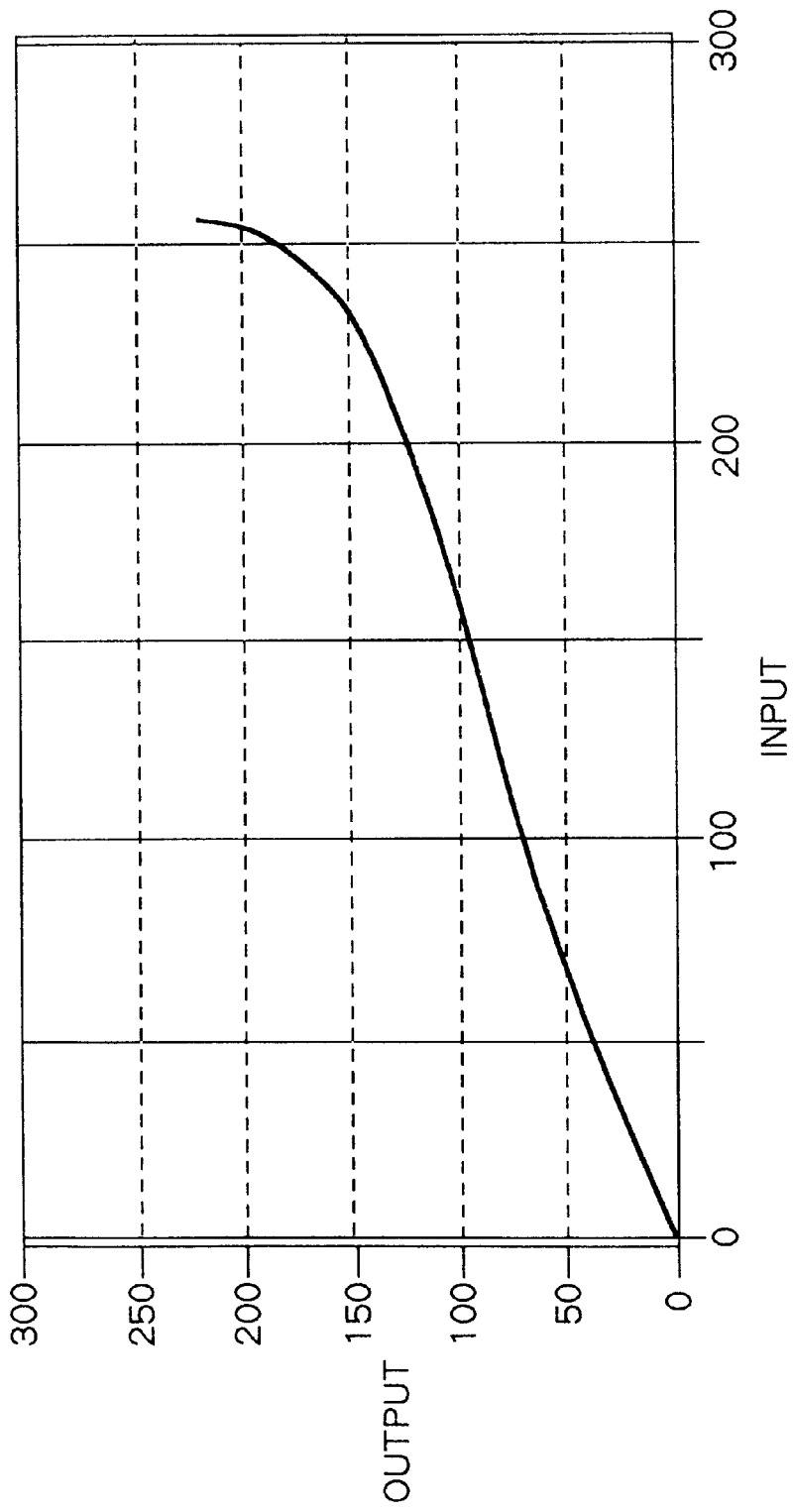
FIG. 8 is a line graph showing Y correction on cyan color.

For example, the function fc( ) of the present embodiment is as shown in FIG. 8. Note that functions for the γ conversion are prepared for the respective color components. Typically, the γ conversion is not performed by each ink-discharge amount, however, in a case where a single color ink cannot be discharged 100%, γ conversion in consideration of the limited ink-discharge amount is required, because the processing as described in FIG. 4 cannot limit the ink-discharge amount with respect to a primary color obtained by a single color ink.

The multilevel C4, M4, Y4 and K4 obtained from the above processing are respectively binarized at steps S1030 to S1033, and binary c, m, y and k data are obtained (steps S1034 to S1037).

Note that a total ink-discharge amount sumCYMK is represented by:

$$sumCMYK=(C+M+Y)-minCMY \times 3$$
$$-(lim3+lim5) \times R$$
$$-(lim1+lim6) \times G$$
$$-(lim2+lim4) \times B$$
$$+pgrCMY \times 3$$
$$+bgrCMY \quad (28)$$

In a case where the maximum ink-discharge amount is 170% with respect to the maximum multilevel value, the total ink-discharge amount is:

$$sumCMYK \leq (C+M+Y)-minCMY \times 3$$
$$-0.3 \times (R+G+B)$$
$$+1.7 \times minCMY$$
$$=(C+M+Y)-1.3 \times minCMY$$
$$-0.3 \times (R+G+B) \quad (29)$$

According to the equation (29), primary colors can be printed without any limitation. Regarding secondary colors, as any of the C, M and Y data has value "0", minCMY= 0holds, and two of the R, G and B data have value "0", the following calculation is performed from the equation (29), $$(C+M+Y)-0.3 \times (R+G+B) \quad (30)$$

In a case where two of the secondary color data respectively have the maximum multilevel value, a coefficient (2–0.3) is applied to the maximum multilevel value. As a result, the sum of the two color data is suppressed to 170%, then the multilevel data are controlled to reside within the maximum ink-discharge amount.

Regarding the tertiary color, the following calculation is performed from the equation (29)

$$(C+M+Y)-1.3 \times minCMY-0.3 \times (R+G+B)$$

In a case where all the color components have the maximum multilevel values (C=M=Y=250), as the values of the C1, M1 and Y1 data are "0" at steps S1011 to S1013, the value of the R, G and B are "0". At last, the equation (29) becomes $$(C+M+Y)-1.3 \times minCMY$$

Thus, a coefficient (3–1.3) is applied to the maximum level. As a result, the sum of the tertiary color levels is suppressed to 170%, then the multilevel data are controlled to reside within the maximum ink-discharge amount.

As described above, according to the present embodiment, ink-discharge amount can be limited in accordance with the features of input data, i.e., primary colors, secondary colors and tertiary colors. This enables appropriate image density control while maintaining an appropriate ink-discharge amount.

Accordingly, in image processing effectively using a color-representation range allowing image printing, appropriate image-density control is performed without exceeding the maximum ink-discharge amount. For example, even in a case where high-quality printing is performed using a print medium which limits ink-discharge amount of secondary colors by ink-jet printing to 200% or less, the image density can be appropriately controlled.

Note that the image density control can be performed in low-resolution printing by setting the coefficients lim1 to lim6, which are used in steps S1019 to S1021, to "0". That is, the present invention can perform processing in accordance with the resolution of the printer.

Note that in the present embodiment, the imagedata processing to separate secondary and tertiary colors and limit each ink-discharge amount has been described as correction of ink-discharge amounts. However, the correction method for the ink-discharge amounts is not limited to this image-data processing. Further, in the present embodiment, the image data is controlled based on ink amounts corresponding to print resolution, however, the image data may be controlled based on the allowable ink-discharge amount.

[Second Embodiment]

Next, the image processing system according to a second embodiment of the present invention will be described in detail.

Figure 9:
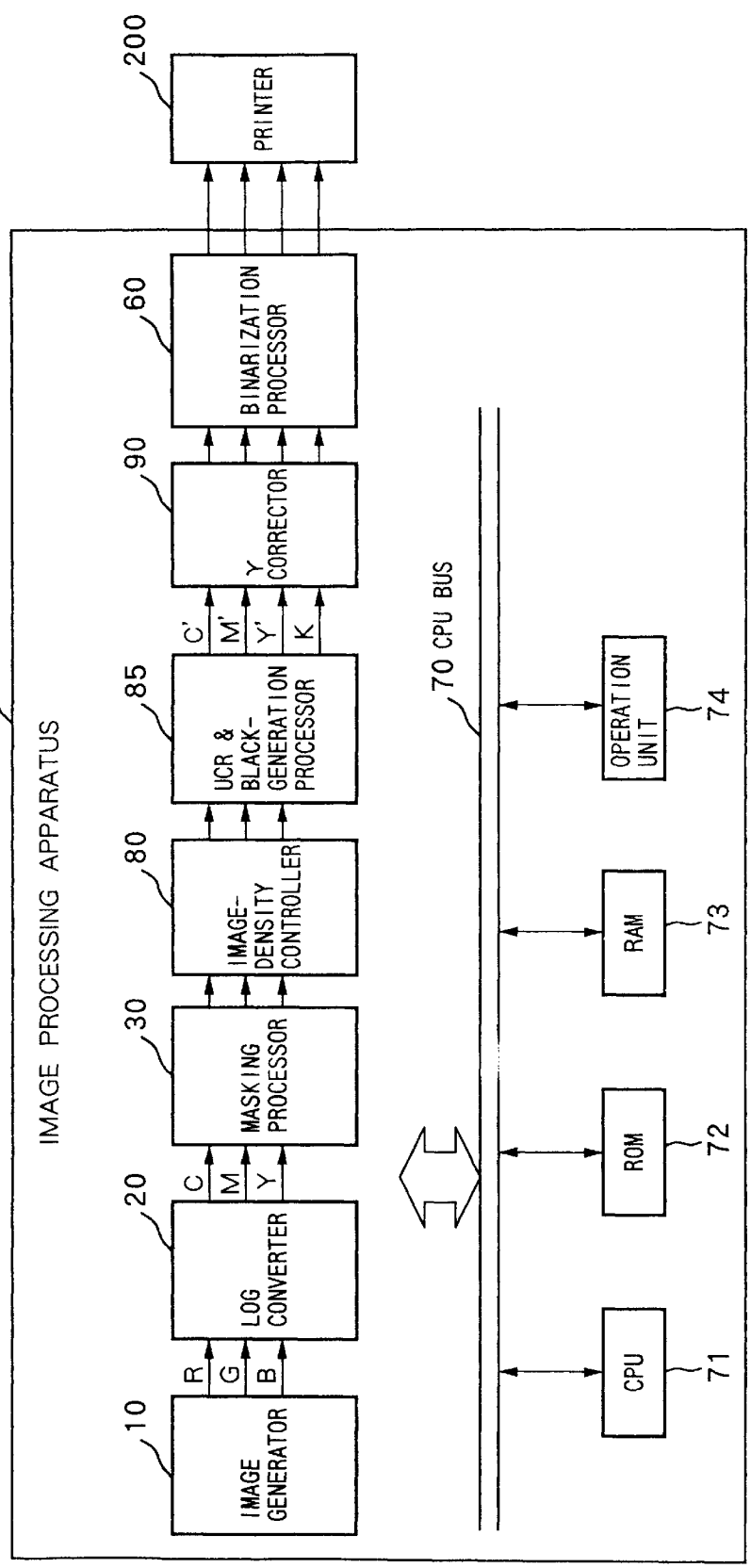
FIG. 9 is a block diagram showing an example of construction of the image processing system according to a second embodiment.

FIG. 9 is a block diagram showing an example of construction of the image processing system according to the second embodiment. In FIG. 9, the elements which function similarly to those of the first embodiment have the same reference numerals, and explanation of these elements will be omitted.

In FIG. 9, an image-density controller 80 performs image-density control to be described later, based on CMY image data inputted from the masking processor 30. An UCR & black-generation processor 85 performs UCR processing and black-generation processing to be described later, based on the CMY image data inputted from the image-density controller 80, and generates C'M'Y'K' image data. A γ corrector 90 performs tonality correction processing on each color component to obtain linear tonality in a print image.

Note that the printer 200 performs printing in accordance with an ink-jet printing method using CMYK color ink for image formation, however, most of recent low-cost color printers form an image by using CMY three color ink excluding K ink, and a printing technique to represent gray color by overlaying the CMY three color ink has been proposed.

Further, in the ink-jet printing method for forming an image by using the CMYK four color ink, a printing technique to improve color reproducibility of a color of a low-density area such as a light color, has been proposed. By this printing technique, a gray color is represented by overlaying CMY three color ink at a low-density area, and as image density increases, the density of K ink is increased.

The image-density control method in these color printers performs density control by changing each ink-discharge amount by, for example, increasing or decreasing the density by each multilevel color data.

However, if density control is performed on an image having a gray balance, obtained by overlaying CMY three colors, by simply increasing or decreasing each color density, the gray balance may be disturbed. For example, if cyan density is increased, the resulted gray has a bluish tint. Hereinbelow, an image-density control processing which enables appropriate image-density control while maintaining bray balance will be described.

Figure 14:
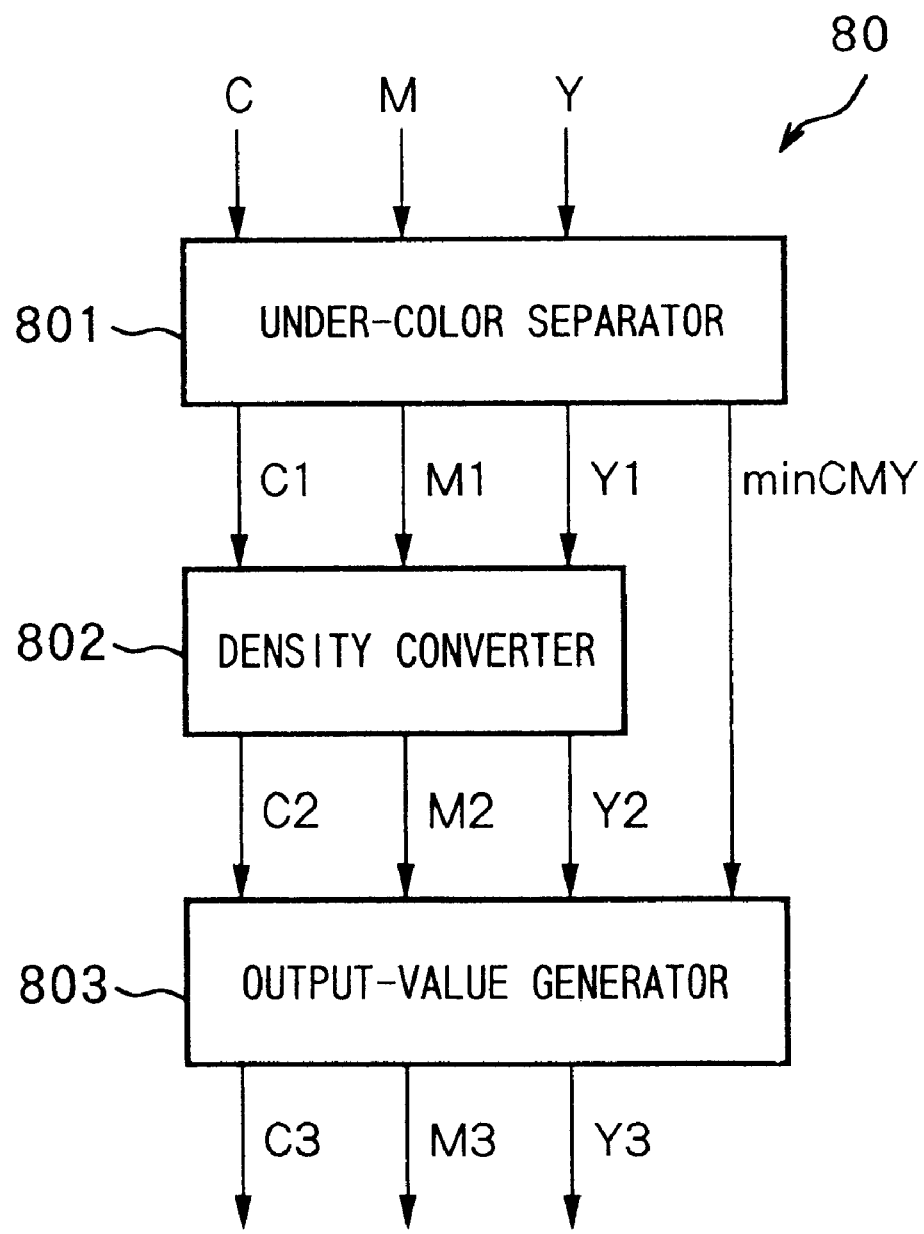
FIG. 14 is a block diagram showing the outline of operation of an image adjustment processor according to the second embodiment.

FIG. 14 is a block diagram showing the outline of operation of an image-density controller 80 according to the second embodiment. A under-color separator 801 separates an achromatic color component (minCMY) from each color component of input CMY data, and outputs C1, M1, Y1 data and the achromatic color component. A density controller 802 performs density control on the C1, M1 and Y1 data from the under-color separator 801, and outputs C2, M2 and Y2 data. An output-value generator 803 returns the achromatic color component (minCMY) to the C2, M2 and Y2 data, and outputs C3, M3 and Y3 data as density-controlled data.

Figure 10:
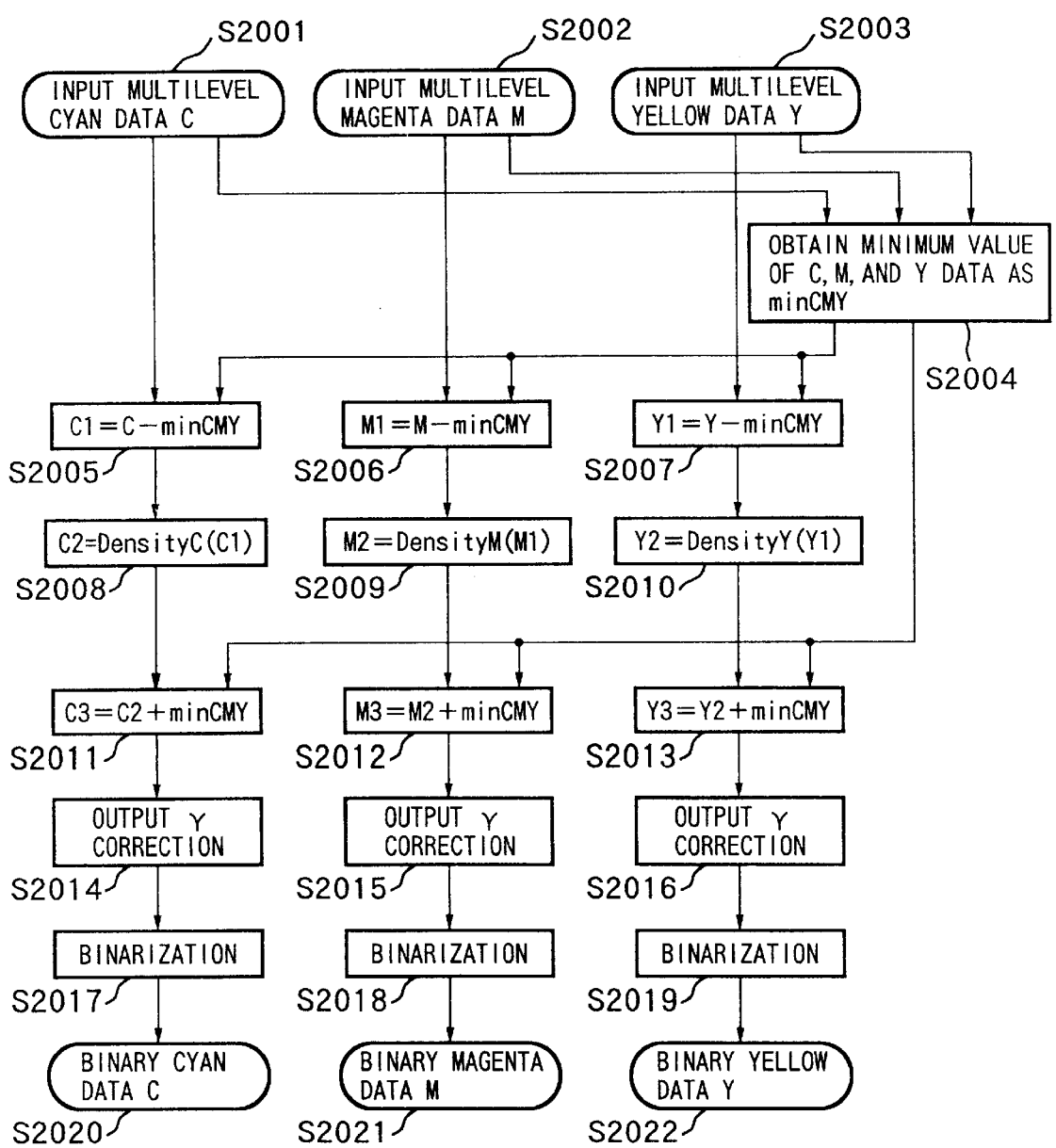
FIG. 10 is a flowchart showing a procedure of image processing according to the second embodiment.

FIG. 10 is a flowchart showing a procedure of image processing according to the second embodiment. Note that the control program for executing the control as shown in FIG. 10 is stored in the ROM 72, and executed by the CPU 71. Further, a part or all the processing as described below may be performed by hardware. Hereinbelow, the flow of processing by the image-density controller 80, the γ corrector 90 and the binarization processor 60 in the image processing apparatus 100 according to the second embodiment will be described with reference to FIG. 10.

Note that the present embodiment will be described in a method forming an image by using CMY three color ink, therefore, the UCR & black-generation processor 85 for generating a black component does not perform any processing.

First, multilevel cyan (C), magenta (M) and yellow (Y) image data are inputted (at steps S2001 to S2003). In this embodiment, each of cyan, magenta and yellow is represented by 8 bits, i.e., 0 to 255 level value. Next, a minimum value minCMY is obtained from the multilevel C, M and Y data (step S2004). Then, the minCMY value is subtracted from the multilevel C, M and Y data so as to separate the multilevel C, M and Y data into an achromatic color component and chromatic color components (C1, M1 and Y1) (steps S2005 to S2007):

$$C1 = C - minCMY \qquad (31)$$

$$M1 = M - minCMY \qquad (32)$$

$$Y1 = Y - minCMY \qquad (33)$$

That is, the achromatic color component is represented by the minimum value minCMY from the multilevel C, M and Y data, and the chromatic color components are represented as data where the minCMY value is subtracted. The above processing is performed by the under-color separator 801.

Next, image-density control is performed on the separated chromatic C1, M1 and Y1 component data. In the present embodiment, image-density control is performed with respect to each color. Assuming that functions for density control of the chromatic color components C, M and Y are DensityC( ), DensityM( ) and DensityY( ), density-controlled C2, M2 and Y2 data are represented by:

$$C2 = DensityC(C1) \qquad (34)$$

$$M2 = DensityM(M1) \qquad (35)$$

$$Y2 = DensityY(Y1) \qquad (36)$$

In case of linear density control, density control processing is performed by obtaining the function as Density( ) in FIG. 5 for each color, holding densitycontrolled values, corresponding to the C, M and Y data of 0 to 255 level, in the form of table, and thereafter, performing density conversion by referring to the tables (steps S2008 to S2010). The above processing is performed by the density controller 802.

The output-value generator 803 adds the achromatic component minCMY to the density-controlled C2, M2 and Y2 data, and generates density-controlled multilevel C3, M3 and Y3 data (steps S2011 to S2013). The C3, M3 and Y3 data from the output-value generator 803 are represented as C', M' and Y' data in FIG. 9.

Regarding gray data, as the input image data has the relation C=M=Y, after the achromatic color component minCMY data is subtracted, the chromatic color components becomes C1=M1=Y1=0. For example, even if the density of cyan color is increased, the chromatic color component of the cyan remains "0", and the density-controlled cyan data C3 obtained at step S2011 corresponds to the cyan data C inputted at step S2001.

That is, as the gray data does not receive any influence of density control of respective colors, the multilevel C, M and Y image data inputted at steps S2001 to S2003 equal the density-controlled multilevel C3, M3 and Y3 data inputted at steps S2001 to S2003, thus maintaining gray balance.

Further, in the second embodiment, density control is not performed on the achromatic color component, however, a function as represented by function Density( ) for the achromatic color component minCMY may be obtained and density control of the achromatic color component may be performed as black density control. Thus, even if density control is performed on the achromatic color component, so far as the multilevel data inputted at steps S2001 to S2003 have the relation C=M=Y, the relation among the density-controlled multilevel data is C3=M3=Y3. Accordingly, the gray data becomes gray data after the black density control, thus maintaining gray balance.

Next, output γ correction (by the γ corrector 90) is performed on the multilevel C3, M3 and Y3 data at steps S2014 to S2016, so as to obtain a linear tonality in a print image. Then, the multilevel C4, M4 and Y4 data from the output γ correction at steps S2014 to S2016 are binarized at steps S2017 to S2019, and binary c, m and y data are obtained (steps S2020 to S2022). Note that the processings by the γ corrector 90 and the binarization processor 60 are substantially identical to those in the first embodiment. Further, the density-controlled CMY data (C3, M3 and Y3) may be subjected to the ink-discharge amount control as described in the first embodiment.

According to the above process procedure, when the input multilevel C, M and Y data are gray data, the data receive no influence of density control at steps S2008 to S2010, thus maintains gray balance after the density control.

Further, even if the black density control is performed on the achromatic color component, as the density-controlled multilevel C, M and Y data is in the relation C=M=Y, the gray data becomes gray data after the black density control, thus maintaining gray balance.

Note that the present embodiment has been described by using density control for each color, however, the image-density control is not limited to this method.

[Third Embodiment]

In the second embodiment, an image is formed by using CMY three color ink, however, a third embodiment will be described as image formation by using CMYK four color ink.

Note that the construction of the image processing apparatus according to the third embodiment is substantially identical to that of the second embodiment, explanation of the image processing apparatus will be omitted, and the procedure of processing by the image density controller 80, the UCR & black-generation processor 85, the γ corrector 90 and the binarization processor 60 of the image processing apparatus 100 according to the third embodiment will be described.

Figure 15:
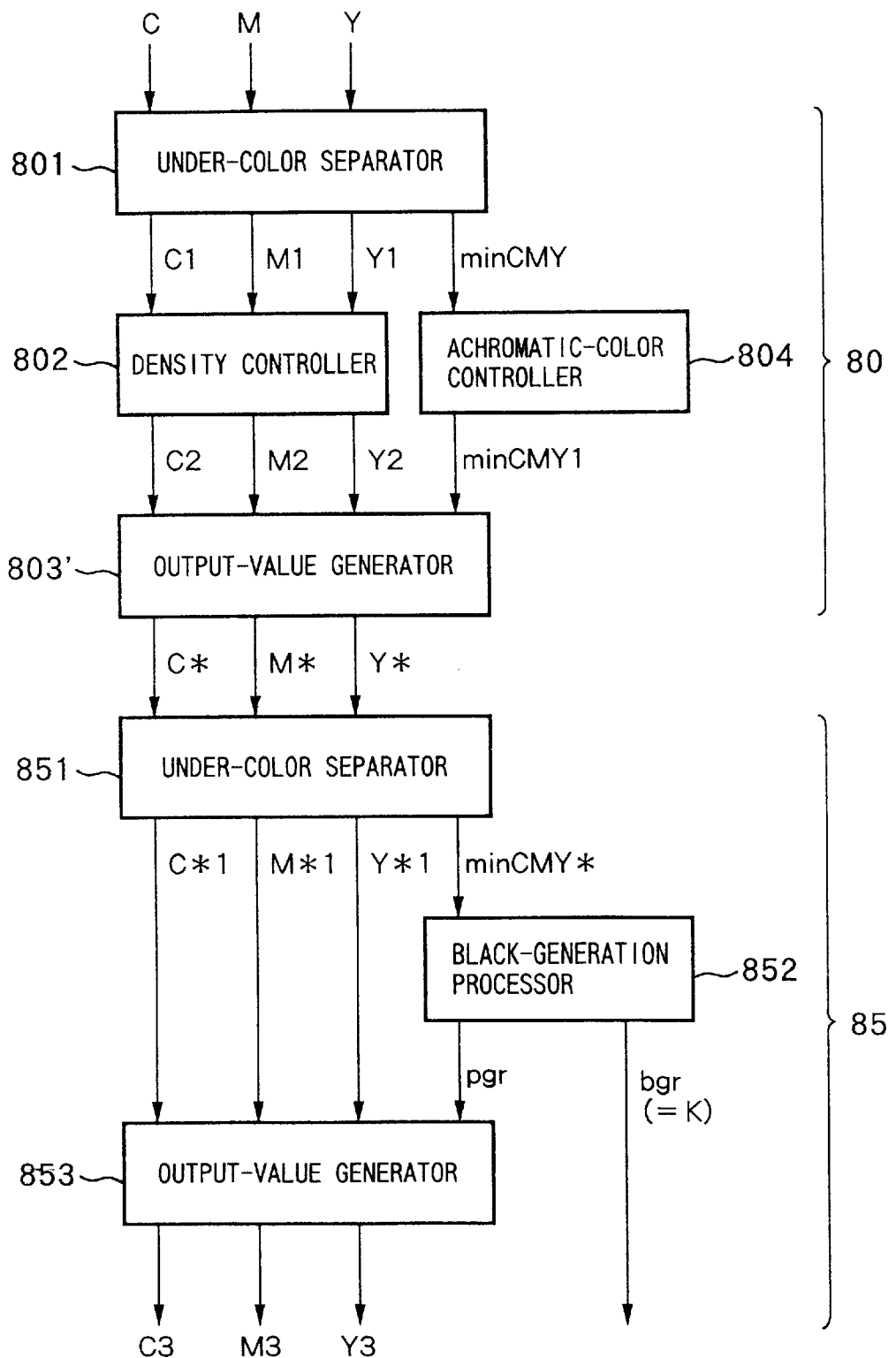
FIG. 15 is a block diagram showing the outline of the image-density controller and UCR & black-generation processor according to the third embodiment.

FIG. 15 is a block diagram showing the outline of the image-density controller 80 and UCR & black-generation processor 85 according to the third embodiment. The under-color separator 801 and the density controller 802 correspond to those in the second embodiment. An achromatic-color controller 804 performs density control on the minCMY data, and outputs minCMY1 data. An output-value generator 803' distributes the minCMY value to the C2, M2 and Y2 data, and outputs C*, M* and Y* data. Note that the image-density controller 80 in FIG. 9 is constructed with the under-color separator 801, the density controller 802, the output-value generator 803' and the achromatic-color controller 804.

The C*, M* and Y* data are separated again into the chromatic color components (C*1, M*1 and Y*1) and an achromatic color component (minCMY) by a under-color separator 851. The achromatic color component (minCMY*) is inputted into a black-generation processor 852. The black-generation processor 852 generates a pgr component to be returned to the C, M and Y components, and a bgr component for image formation with black ink, from the achromatic color component (minCMY*). An output-value generator 853 adds the pgr component to the respective C*1, M*1 and Y*1 components, and generates final output values C3, M3 and Y3. Note that the UCR & black generator 85 is constructed with the under-color separator 851, the black generation processor 852 and the output-value generator 853.

Figure 11:
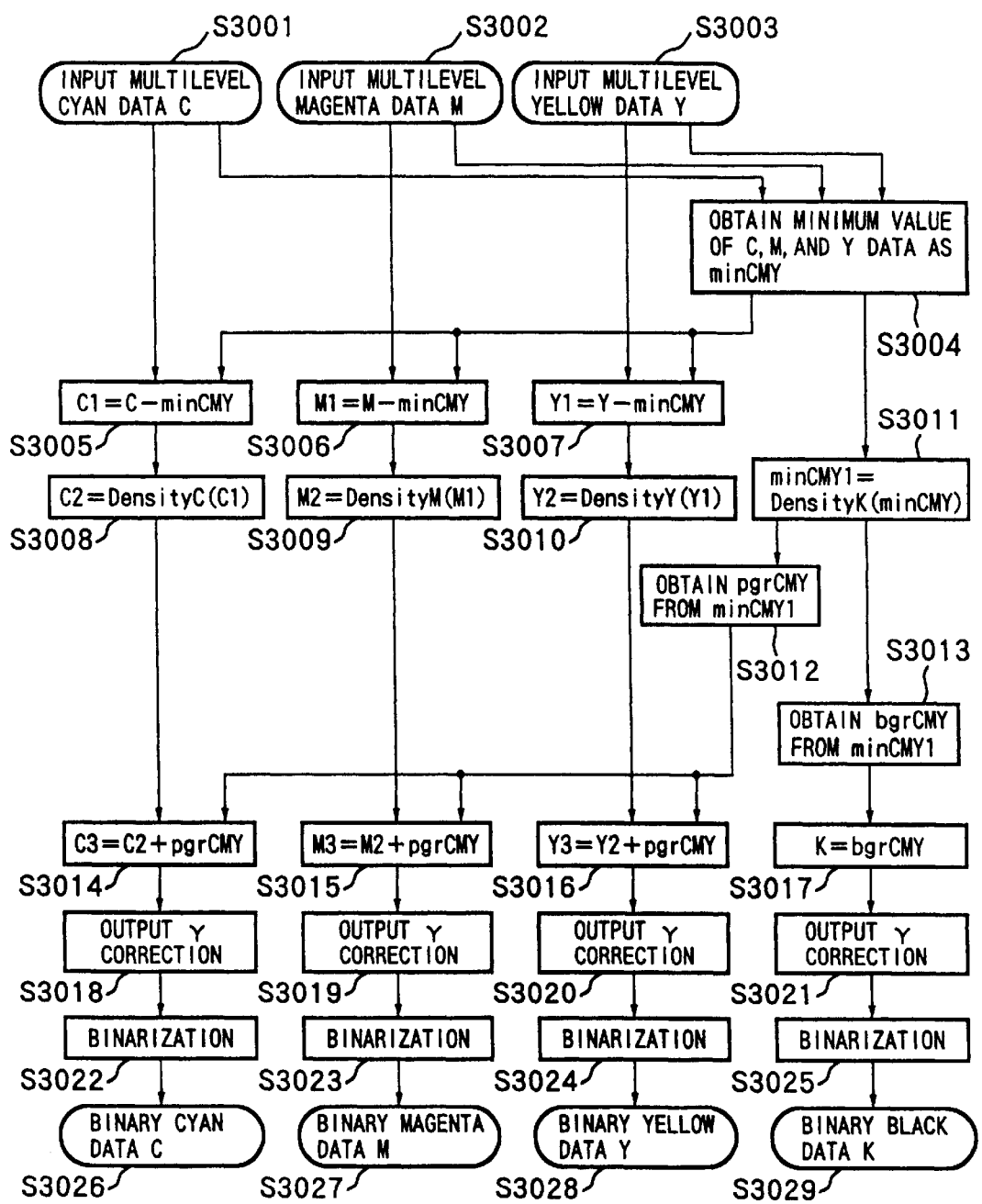
FIG. 11 is a flowchart showing a procedure of image processing according to a third embodiment.

FIG. 11 is a flowchart showing a procedure of image processing according to the third embodiment. Note that the control program for executing the control as shown in FIG. 11 is stored in the ROM 72, and executed by the CPU 71. Further, a part or all the processing as described below may be performed by hardware.

First, multilevel cyan (C), magenta (M) and yellow (Y) image data are inputted (steps S3001 to S3003). In the third embodiment, each of the C, M and Y component data is represented by 8 bits, i.e., 0 to 255 level value. Next, the minimum value minCMY is obtained from the multilevel C, M and Y data (step S3004).

Then, the value of the minCMY data is subtracted from the multilevel C, M and Y data. That is, the multilevel C, M and Y data are separated into chromatic color components (C1, M1 and Y1) and an achromatic color component (minCMY) from the above-described expressions (31) to (33) (steps S3005 to S3007). The above processing is performed by the under-color separator 801.

Next, the density controller 802 and the achromatic-color controller 804 perform image-density control on the chromatic color components C1, M1 and Y1 the achromatic color component minCMY. Similar to the second embodiment, the present embodiment is described as image-density control by controlling densities of respective colors. Assuming that functions for density control on the chromatic color components C1, M1 and Y1 and the achromatic color component minCMY are DensityC( ), DensityM( ), DensityY( ) and DensityKo, density-controlled C, M, Y and minCMY data are obtained from:

$$C2 = DensityC(C1) \tag{37}$$

$$M2 = DensityM(M1) \tag{38}$$

$$Y2 = DensityY(Y1) \tag{39}$$

$$minCMY1 = DensityK(minCMY) \tag{40}$$

Similar to the second embodiment, in a case where a linear density control is performed as a density control method, functions such as the function Density( ) as shown in FIG. 5 are obtained for the respective colors and held in the form of table. Upon density control, these tables are referred to for obtaining density-controlled values corresponding to 0 to 255 level C, M, Y and minCMY data (steps S3008 to S3011).

Next, the output-value generator 803' adds the density-controlled achromatic color component minCMY1 to the density-controlled chromatic color components (C2, M2 and Y2), and generates density-controlled multilevel C, M and Y data:

$$C^* = C2 + minCMY1 \tag{41}$$

$$M^* = M2 + minCMY1 \tag{42}$$

$$Y^* = Y2 + minCMY1 \tag{43}$$

Regarding gray data, as the input image data are in the relation C=M=Y, when the achromatic color component minCMY is subtracted, the chromatic color components are in the relation C=M=Y=0. For example, even cyan density is increased at step S3008, as the value of the cyan chromatic color component remains "0", it does not receive any influence of C, M and Y density control. As the density-controlled achromatic component minCMY is added to the density-controlled chromatic color components, the values of the multilevel C*, M* and Y* become equal to each other (C*=M*=Y*) which is gray data, thus maintaining gray balance.

Next, the C*, M* and Y* data obtained by the above equations (41) to (43) are inputted into the UCR & black-generation processor 85 for under-color removal processing and black-generation processing.

First, the under-color separator 851 obtains the minimum value minCMY* of the input C*, M* and Y* data, and subtracts the minCMY* value from the C*, M* and Y*, thus separates the multilevel C, M and Y data into chromatic color components and an achromatic color component:

$$C^*1 = C^* - minCMY^* \tag{44}$$

$$M^*1 = M^* - minCMY^* \tag{45}$$

$$Y^*1 = Y^* - minCMY^* \tag{46}$$

The minCMY* data added to the C2, M2 and Y2 data in the equations (41) to (43) equals the minCMY* data subtracted from the C*, M* and Y* data, and the C*1, M*1 and Y*1 data equal the C2, M2 and Y2 data. Accordingly, the processings of the equations (41) to (43) and the equations

(44) to (46) may be omitted, i.e., the output-value generator 803' and the under-color separator 851 in FIG. 15 may be omitted.

In the present embodiment (FIG. 11), the processings of the equations (41) to (43) and the equations (44) to (46) are omitted. Such omission is possible because the under-color removal at steps S3005 to S3007 and the under-color removal by the equations (44) to (46) are performed as 100% UCR processing to remove 100% of the minimum values. Unless the 100% UCR processing is performed, the procedure as shown by the equations (41) to (46) may be required.

At step S3013, a multilevel K data is generated from the value of the minCMY1 data. Assuming that the function for this processing is BGR( ), the multilevel K data bgrCMY is represented by:

$$bgrCMY = BGR(minCMY1) \tag{47}$$

Further, the multilevel pgrCMY data to be returned to the respective Y, M and C data is obtained from the minCMY1 data (step S3012). Assuming that the function for obtaining the pgrCMY data is PGR( ), the pgrCMY is represented by:

$$pgrCMY = PGR(minCMY1) \tag{48}$$

Thus, the black-generation processor 852 generates the pgr and bgr components.

Next, the output-value generator 853 generates output data C3, M3, Y3 and K (steps S3014 to S3017) from the C2, M2 and Y2 data obtained at steps S3008 to S3010 and the pgrCMY and bgrCMY values obtained at steps S3012 and S2013:

$$C3 = C2 + pgrCMY \tag{49}$$

$$M3 = M2 + pgrCMY \tag{50}$$

$$Y3 = Y2 + pgrCMY \tag{51}$$

$$K = bgrCMY \tag{52}$$

Figure 12:
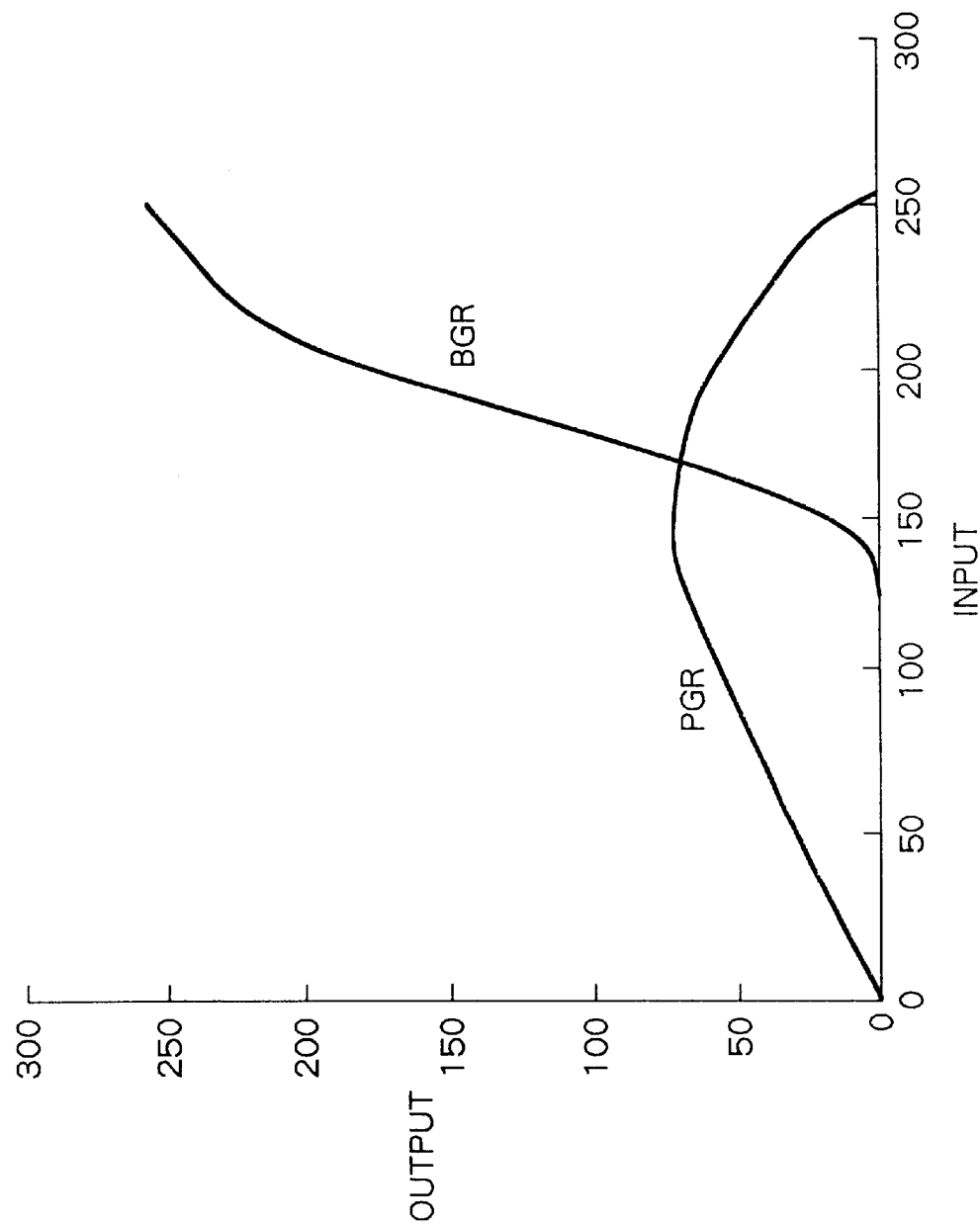
FIG. 12 is a line graph showing the functions BGR( ) and PGR( ) according to the third embodiment.

In a low density area, to improve reproducibility of a color such as a light color, the functions BGR( ) and PGR( ) are set such that a gray-scale color is represented by overlaying CMY three color ink at a low-density area, and as image density increases, the density of K ink is increased. FIG. 12 is a line graph showing the BGR( ) function and PGR( ) function according to the third embodiment. The C3, M3, Y3 and K data are represented as C', M', Y' and K data in FIG. 9.

Next, output γ correction is performed on the multilevel C3, M3, Y3 and K data obtained as above at steps S3018 to S3021, to obtain a linear tonality in print image. Then, multilevel C3', M3', Y3' and K' data obtained from the γ correction are respectively binarized (steps S3022 to S3025), and cyan, magenta, yellow and black binary data c, m, y and k are obtained (steps S3026 to S3029).

According to the above processing, when the input multilevel C, M and Y data are gray data, only density control of K component is performed without any influence of density control of C, M and Y components, thus the gray balance can be maintained after the density control.

Note that the present embodiment has been described by using density control of respective colors, however, the image-density control is not limited to this density control method.

Further, in the above embodiments, the image formation is not necessarily performed in accordance with the ink-jet printing, but may be performed in accordance with an electrophotographic printing which enables multilevel printing.

Further, a printhead which discharges ink droplets by film boiling utilizing thermal energy and a printing method using this printhead may be employed.

As described above, the present invention enables appropriate image-density control in a printer where an ink-discharge amount is limited.

Further, according to the present invention, appropriate image-density control can be performed while maintaining gray balance.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:

obtaining means for obtaining the minimum value of a plurality of color component data included in color image data;

subtraction means for subtracting said minimum value from each of the plurality of color component data;

density control means for performing, in accordance with a user's instruction, image-density control on the plurality of color component data where said minimum value is subtracted;

adding means for adding said minimum value to the plurality of color component data density-controlled by said density control means; and tonality correction means for performing tonality correction on the color component data where said minimum value is added by said adding means, so as to correct non-linear tonality of the image data.

2. The image processing apparatus according to claim 1, further comprising quantization means for quantizing the image data tonality-corrected by said tonality correction means, and image forming means for forming an image based on the image data quantized by said quantization means.

3. The image processing apparatus according to claim 1, further comprising limitation means for limiting sum value of the color components constituting image data to which the under color is added by said adding means.

4. An image processing apparatus comprising:

under-color removal means for performing under-color removal on color image data;

density control mean for performing, in accordance with a user's instruction, image-density control on an under color removed by said under-color removal means and the image data under-color removed by said under-color removal means;

adding means for adding data, corresponding to the density controlled under color, to the density controlled and under-color removed image data, thereby generating color components;

black generating means for generating a black component based on the density-controlled under color; and tonality correction means for performing tonality correction on the color components generated by said adding means and the black component generated by said black generating means, so as to correct non-linear tonality.

5. The image processing apparatus according to claim 4, wherein said adding means adds data obtained by multiplying the density-controlled under color by a predetermined coefficient, to the density controlled and under-color removed image data.

6. An image processing method comprising:

an obtaining step of obtaining the minimum value of a plurality of color component data included in color image data;

a subtraction step of subtracting said minimum value from each of the plurality of color component data;

a density-control step of performing, in accordance with a user's instruction, image-density control on the plurality of color component data where said minimum value has been subtracted at said subtraction step;

an adding step of adding said minimum value to the plurality of color component data density-controlled at said density-control step; and tonality correction step of performing tonality correction on the color component data where said minimum value has been added at said adding step, so as to correct non-linear tonality.

7. The image processing apparatus according to claim 6, further comprising limitation means for limiting sum value of the color components constituting image data to which the under color is added by said adding means.

8. An image processing method comprising:

an under-color removal step of performing under-color removal on color image data;

a density control step of performing, in accordance with a user's instruction, image-density control on an under color removed at said under-color removal step and the image data under-color removed at said under-color removal step;

an adding step of adding data, corresponding to the density controlled under color, to the density controlled and under-color removed image data, thereby generating color components;

a black generating step of generating black component based on the density controlled under color; and a tonality correction step of performing tonality correction on color components generated at said adding step and the black component generated at the black generating step, so as to correct non-linear tonality.

9. A computer-readable memory containing a control program enabling density control on image data, said control program including program codes for executing:

an obtaining step of obtaining the minimum value of a plurality of color component data included in color image data;

a subtraction step of subtracting said minimum value from each of the plurality of color component data;

a density control step of performing, in accordance with a user's instruction, image-density control on the plurality of color component data where said minimum value has been subtracted at said subtraction step;

an adding step of adding said minimum value to the plurality of color component data density-controlled at said density control step; and a tonality correction step of performing tonality correction on the color component data where said minimum value has been added at said adding step, so as to correct non-linear tonality.

10. A computer-readable memory containing a control program enabling density control on image data, said control program including program codes for executing:

an under-color removal step of performing under-color removal on color image data;

a density control step of performing, in accordance with a user's instruction, image-density control on an under color removed at said under-color removal step and the image data under-color removed at said under-color removal step;

an adding step of adding data, corresponding to the density controlled under color, to the density controlled and under-color removed image data, thereby generating color components;

a black generating step of generating black component based on the density controlled under color; and a tonality correction step of performing tonality correction on the color components generated at said adding step and the black component generated at the black generating step, so as to correct non-linear tonality.

* * * * *

UNITED STATES PATENT AND TRADEMARK OFFICE
CERTIFICATE OF CORRECTION

PATENT NO. : 6,304,338 B1
DATED : October 16, 2001
INVENTOR(S) : Kazuyoshi Sumiuchi et al.

It is certified that error appears in the above-identified patent and that said Letters Patent is hereby corrected as shown below:

Title page,
Item [22] Filed, "June 7, 1997" should read -- June 6, 1997 --.

Column 8,
Line 40, "ODMO," should read -- ODM( ) --.

Column 9,
Line 51, "0holds," should read -- 0 holds --.

Column 10,
Line 28, "imagedata" should read -- image data --.

Column 12,
Line 12, "densitycontrolled" should read -- density-controlled --.

Signed and Sealed this

Twenty-first Day of May, 2002

Attest:

Attesting Officer

JAMES E. ROGAN
Director of the United States Patent and Trademark Office